(12) United States Patent
Yoshimoto et al.

(10) Patent No.: US 8,051,649 B2
(45) Date of Patent: Nov. 8, 2011

(54) HYDRAULICALLY DRIVEN INDUSTRIAL MACHINE

(75) Inventors: Mitsuhiro Yoshimoto, Ibaraki (JP); Genroku Sugiyama, Ibaraki (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 763 days.

(21) Appl. No.: 12/278,404

(22) PCT Filed: Feb. 6, 2007

(86) PCT No.: PCT/JP2007/051967
§ 371 (c)(1),
(2), (4) Date: Aug. 6, 2008

(87) PCT Pub. No.: WO2007/091534
PCT Pub. Date: Aug. 16, 2007

(65) Prior Publication Data
US 2009/0217656 A1 Sep. 3, 2009

(30) Foreign Application Priority Data
Feb. 8, 2006 (JP) .................... 2006-030749

(51) Int. Cl.
*F16D 31/02* (2006.01)
(52) U.S. Cl. .................... 60/329; 60/456
(58) Field of Classification Search .......... 60/329, 60/456
See application file for complete search history.

(56) References Cited

U.S. PATENT DOCUMENTS

| 6,311,488 | B1 | 11/2001 | Maruta et al. |
| 6,966,180 | B2 * | 11/2005 | Deneir et al. .................... 60/329 |
| 2006/0150621 | A1 | 7/2006 | Nakata et al. |

FOREIGN PATENT DOCUMENTS

| JP | 10-169440 | 6/1998 |
| JP | 2000-130164 | 5/2000 |
| JP | 2000-161060 | 6/2000 |
| JP | 2001-132710 | 5/2001 |
| JP | 2002-130216 | 5/2002 |
| JP | 2004-162860 | 6/2004 |
| JP | 2004-239389 | 8/2004 |
| JP | 2005-036881 | 2/2005 |
| JP | 2005-155698 | 6/2005 |

* cited by examiner

*Primary Examiner* — Daniel Lopez
(74) *Attorney, Agent, or Firm* — Antonelli, Terry, Stout & Kraus, LLP.

(57) ABSTRACT

A hydraulically driven industrial machine having a variable displacement type hydraulic pump adapted to take in and pressurized working oil from an working oil tank, a hydraulic actuator to be driven by pressurized working oil delivered from the hydraulic pump through a control valve to perform a predetermined job, a variable return oil cooling means capable of cooling return oil from the hydraulic actuator at a varying cooling rate, an operational load detection means adapted to detect an operational load factor of the hydraulic actuator, and a control means adapted to vary the return oil cooling rate on the basis of an operational load factor detected by the operational load detection means.

13 Claims, 7 Drawing Sheets

HYDRAULICALLY DRIVEN INDUSTRIAL MACHINE

BACKGROUND OF THE INVENTION

1. Field of the Art

This invention relates to hydraulically driven industrial machines including construction machines such as hydraulic power shovel type excavators or the like, and more particularly to a hydraulically driven industrial machine which is capable of effectively controlling temperature of working oil in a hydraulic circuit system to perform various jobs in an energy-saving manner.

2. Technical Background

As an example of hydraulically driven industrial machine, there are construction machines which are equipped with a digging mechanism like a hydraulic power shovel excavator to carry out a ground excavating operation. A hydraulic circuit on a construction machine of this sort normally includes a variable displacement type hydraulic pump driven from an engine to pressurize working oil which is taken in from a working oil tank. Through a control valve, pressurized working oil delivered by the hydraulic pump is supplied to hydraulic actuators including hydraulic cylinders and hydraulic motors to drive these hydraulic actuators. As a result, various operating components of the machine, like a vehicle drive mechanism, a swing mechanism and a working tool, are put in operation to carry out intended jobs. Return oil from hydraulic actuators is sent back to the working oil tank through the control valve for recirculation. Therefore, a suction conduit is connected between the hydraulic pump and the working oil tank, while a delivery or discharge conduit is connected between the hydraulic pump and the control valve. The control valve is connected to the respective hydraulic actuators by way of paired supply and drain conduits. Further, the control valve is connected to the working oil tank by way of a return oil conduit. Thus, the hydraulic circuit is arranged to constitute a closed circuit as a whole.

In operation, heat is generated by hydraulic actuators. As a result, working oil which flows through hydraulic conduits of the closed circuit is heated up, making it necessary to let return oil from hydraulic actuators cool down. For this purpose, usually an oil cooling means is provided in the aforementioned oil return passage. As a working oil cooling means, construction machines usually employ an oil cooler which is an assembly of a large number of narrow pipes and a cooling fan which sends forth cooling air toward the oil cooler.

The cooling fan is driven by an engine, so that the number of revolutions of the cooling fan is varied depending upon the number of revolutions of the engine, affecting the cooling effect of the oil cooler on return oil. In order to overcome this problem, Patent Literature 1 below discloses an oil cooler employing an independent hydraulic motor for driving a cooling fan free from influences of the engine speed. In this case, the hydraulic motor for driving a cooling fan is constituted by a variable displacement hydraulic motor which is adapted to drive the cooling fan at a speed which is determined in relation with a detected temperature of working oil to maintain the oil temperature at a target level.

Patent Literature 1: Japanese Laid-Open Patent Application 2000-130164

DISCLOSURE OF THE INVENTION

Problem(s) Solved by the Invention

To realize energy-saving operations of hydraulic construction machines of the sort as mentioned above, it is essential for a hydraulic circuit to be able to transmit energy efficiently, suppressing energy losses and wasteful energy consumption. In order to enhance the energy transmission efficiency, it is necessary to improve mechanical efficiency as well as volumetric efficiency of a hydraulic pump and to suppress pressure losses and leaks in a control valve and in hydraulic conduits. As will be mentioned later on, various operational factors are varied depending upon the viscosity of working oil which flows through a hydraulic circuit. Viscosity of working oil varies approximately in proportion to its temperature, becoming higher at lower temperatures and lower at higher temperatures. Therefore, as described in the prior art patent application mentioned above, it is important to control a rotational speed of a cooling fan according to a target oil temperature.

By the way, in order to improve the mechanical efficiency of a hydraulic pump and to suppress pressure losses in hydraulic conduits to a minimum, the viscosity of working oil should be at a relatively low level. Conversely, in order to improve the volumetric efficiency of a hydraulic pump and to suppress leaks from a control valve or other components to a minimum, the viscosity of working oil should be at a relatively high level. Thus, in some cases, power transmission efficiency can be improved by controlling the viscosity of working oil to a low level in the relations between discharge pressure and discharge rate of a hydraulic pump.

In a case where a working load of an industrial machine as well as a flow rate of working oil flowing through a hydraulic circuit is constant, it suffices to control the temperature of working oil constantly at a predetermined optimum level where a hydraulic pump can be operated most efficiently and pressure losses of the working oil flowing through the hydraulic circuit as well as oil leaks from a control valve can be suppressed to a minimum. However, operational load conditions of a machine vary depending upon the nature of jobs to be performed by the machine. For example, a working mechanism of a hydraulic power shovel type excavator is required to handle large loads when carrying out a heavy ground excavating work on a hard or rocky ground. On the other hand, when at a light load work like ground leveling or excavation of a soft ground, the working mechanism is required to handle only relatively small loads. Therefore, depending upon the nature of jobs to be performed, a control system which is arranged to maintain a constant oil temperature does not necessarily contribute to enhance the efficiency of the whole hydraulic circuit system.

It is an object of the present invention to enhance the efficiency of a hydraulic circuit system of a hydraulically operating industrial machine for energy-saving purposes by varying cooling rate of return oil in relation with variations in operational loads.

Means for Solving Problem(s)

In order to achieve the above-stated objective, according to the present invention, there is provided a hydraulically driven industrial machine having a variable displacement type hydraulic pump operative to take in and pressurize working oil from a working oil tank, and a hydraulic actuator supplied with discharge oil of the hydraulic pump through a control valve to perform a predetermined job: a variable return oil cooling means capable of cooling return oil from said hydraulic actuator at a variable cooling rate to control a working oil temperature to a given level; an operational load detection means adapted to detect operational load conditions of the hydraulic actuator; and a control means adapted to measure an operational load factor of the hydraulic actuator within a predetermined unit time period of detection cycle to get a mean value of the load factor as a past record of working load data, and to determine a cooling rate of return oil from the hydraulic actuator on the basis of the past record of working load data.

In this instance, at the variable working oil cooling means, a return oil conduit from the hydraulic actuator is bifurcated into a cooling return oil passage and a non-cooling return oil passage, controlling a ratio of flow rates through the two return oil passages by means of a variable distribution means. For instance, a return oil conduit is bifurcated into a first passage running through an oil cooler and a second passage bypassing the oil cooler, providing a distributor valve such as an electromagnetic proportional valve at a point of bifurcation to control the flow rates of return oil through the two passages in a given ratio. In such a case, the oil cooler may be either an air-cooling type or a water-cooling type. In the case of an air-cooling type cooler, a cooling fan can be rotationally driven by a hydraulic motor or the like, which is associated with a rotational speed control means which is in turn adapted to control the number of revolutions of the cooling fan according to a signal from the control means to constitute a variable return oil cooling means.

For detecting operational load conditions of the hydraulic actuator, the operational load detection means can be arranged to detect a discharge pressure or discharge flow rate of the hydraulic pump. By so arranging, load conditions of the hydraulic pump can be detected easily in a secure manner. In this regard, it is to be noted that operational load conditions are not constant when a machine is at work, and change continually. Therefore, it is desirable to make arrangements to get, as an operational load, a mean value of pressure (or flow rate) detected in each unit time period of detection cycle. On the basis of an operational load which has been detected in this manner, the control means dispatches a signal to the variable return oil cooling means to increase a return oil cooling rate in a heavy load operation and to lower a return oil cooling rate in a light load operation. The cooling rate is controlled at least by way of two independent stages depending upon operational load conditions, i.e., a control stage for a heavy load operation and a control stage for a light load operation. However, it may be controlled by way of more than two stages or alternatively continuously in one stage if desired.

The control of the return oil cooling rate by the control means is carried out on the basis of an operational load which is detected by the operational load detection means. However, as mentioned above, operational load conditions of a machine change constantly. If the control means were arranged to vary the return oil cooling rate constantly in proportion to variations in operating load conditions, it would impose a considerable burden on the part of the working oil cooling means. In order to ensure stable operations of the working oil cooling means, it is desirable to measure, as a past record of operational load data, a mean value of a factor of operational load conditions (e.g., a mean oil temperature or a mean oil pressure) in each unit time period of detection cycle, computing an optimum cooling rate on the basis of the past record of detected operational load data. In this instance, each unit time period of detection cycle is preferred to have a duration, for example, at least as long as 1 hour, or to have a duration of two or three hours or a duration of one day.

Hydraulically driven industrial machines in general include construction machines such as vehicular hydraulic shovel type excavators which are in many cases used continually in predetermined operating conditions at similar working sites, with an almost unchanged load factor. In such a case, the control means may be arranged to review the return oil cooling rate on the basis of a past record of operational load data over a predetermined time period when changing a working site or when changing operating conditions. In this instance, return oil is cooled at a constant rate as long as a machine is operated at the same site or under the same load conditions. The control means may be arranged to start a cooling rate reviewing procedure on the basis a past record of operational load data when a corresponding command signal is entered by an operator or upon detecting relocation to a new working site. For a more fine control, the control means may be arranged to get a past record of operational load data in each unit of detection time periods of a predetermined duration and to compute a fresh cooling rate in the next unit of detection time periods on the basis of the acquired past record. Furthermore, the control means may be arranged to set a return oil cooling rate in the next unit of detection time periods on the basis of a varying average of operational loads in a plural number of preceding units of detection time periods.

Effects of the Invention

By varying the return oil cooling rate according to operational load conditions as described above, the energy transmission efficiency from the hydraulic pump to the hydraulic actuator can be improved significantly to operate the machine in an energy-saving manner.

BEST MODE FOR CARRYING OUT THE INVENTION

Figure 1:
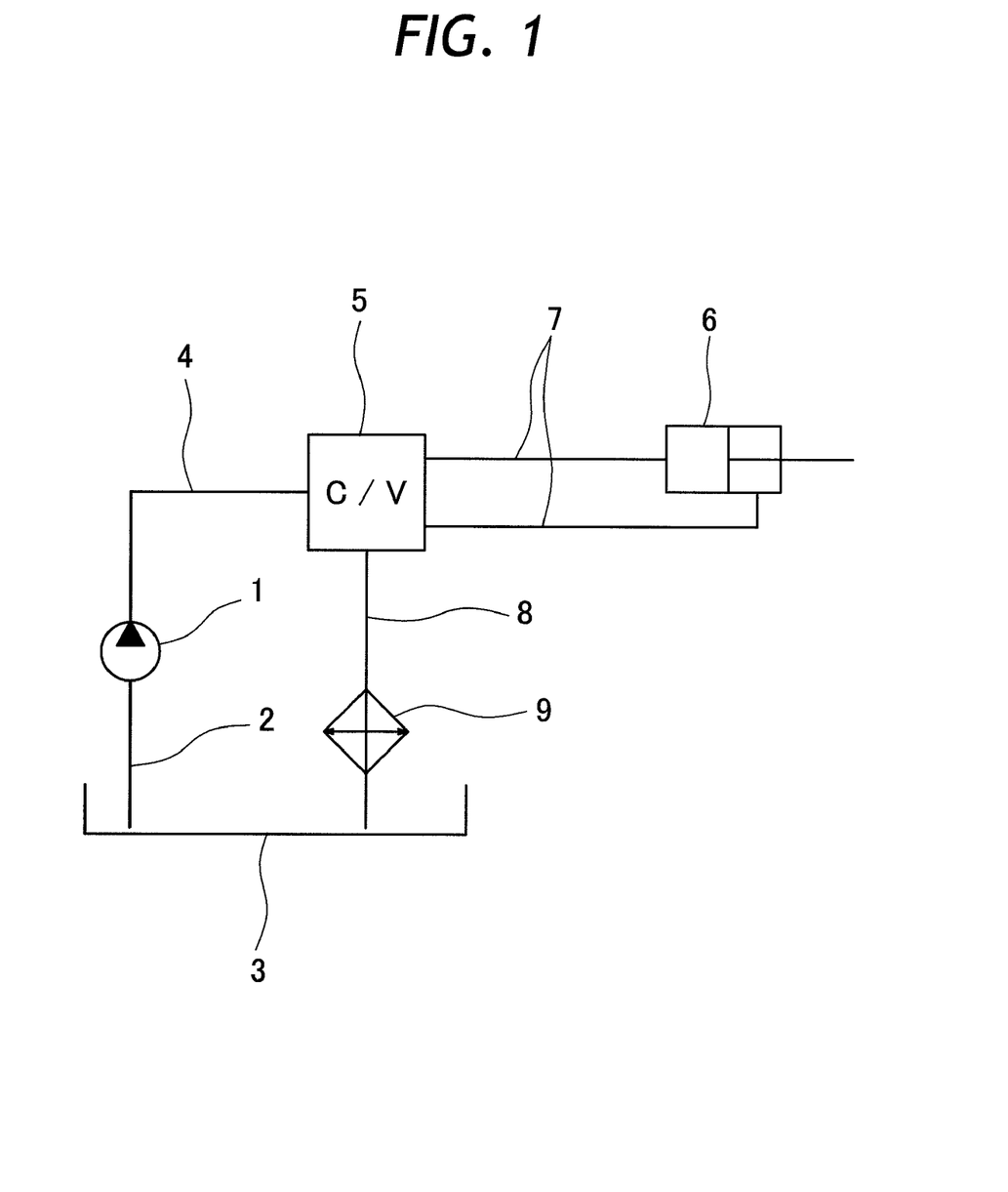
FIG. 1 A hydraulic circuit diagram, showing a hydraulic circuit system for use on a hydraulically driven industrial machine.

Hereafter, the present invention is described more particularly by way of its preferred embodiments with reference to the accompanying drawings. Shown schematically in FIG. 1 is a hydraulic circuit intended for use on industrial hydraulic machines. Here, by way of example, the hydraulic circuit is applied to a hydraulic shovel excavator, a typical example of hydraulically driven industrial machines which involve large variations in operational load conditions when at work. Needless to say, application of the hydraulic circuit according to the invention is not limited to an industrial machine of this sort.

In FIG. 1, indicated at 1 is a variable displacement type hydraulic pump, for example, a bent axis or swash plate type hydraulic pump, which takes in from a working oil tank 3 through a suction pipe and delivers pressurized oil through a discharge conduit 4. The discharge conduit 4 of the hydraulic pump 1 is connected to a control valve 5. Paired supply and drain conduits 7 are connected between the control valve 5 and, for example, a hydraulic actuator such as a hydraulic cylinder (or hydraulic motor). Further, one end of a return conduit 8 is connected to the control valve 5, the other end of which is connected to the working oil tank 3. An oil cooler 9 is provided within the length of the return conduit 8 for cooling return oil. In FIG. 1, only one hydraulic pump 1 is shown along with only one hydraulic actuator 6 for the sake of simplicity of illustration. However, generally a plural number of hydraulic actuators 6 and a plural number of hydraulic pumps are provided on industrial machines like hydraulic shovel excavators.

In the case of a hydraulic shovel excavator, operational load conditions vary largely depending upon mode of operation and nature of a job to be performed. As shown in the diagram FIG. 2, a diagram of the so-called P-Q characteristics showing relations between output pressure (P) and output flow rate (Q) of the hydraulic pump 1, there is a tendency that the output flow rate becomes greater at a lower output pressure, and the output flow rate becomes smaller at a higher output pressure. That is to say, the output flow rate from the hydraulic pump 1 becomes smaller in a heavy load job which requires a high output pressure, and becomes larger in a light load job at a low output pressure.

Figure 2:
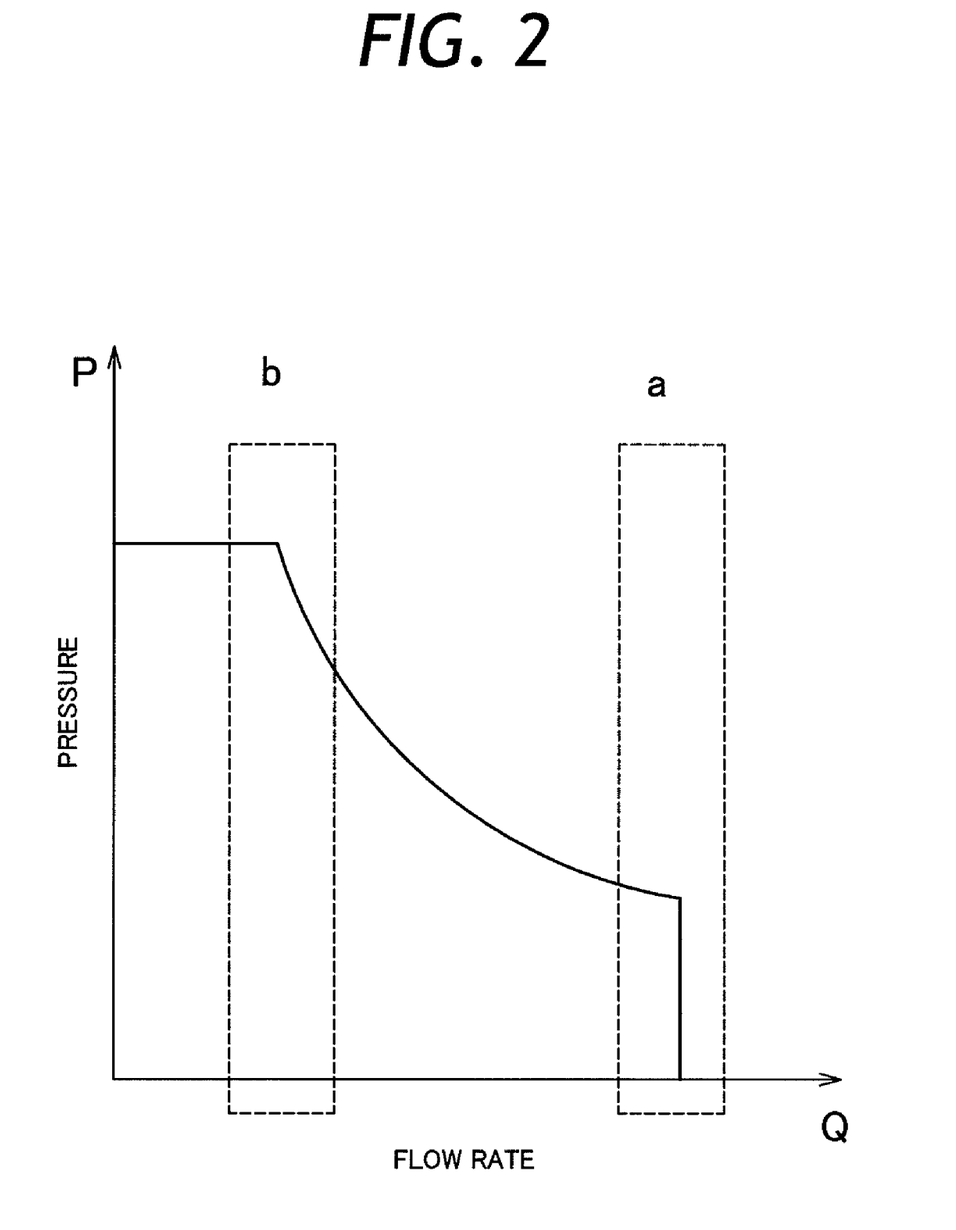
FIG. 2 A diagram showing relations between discharge pressure and discharge flow rate of a hydraulic pump.
Figure 3:
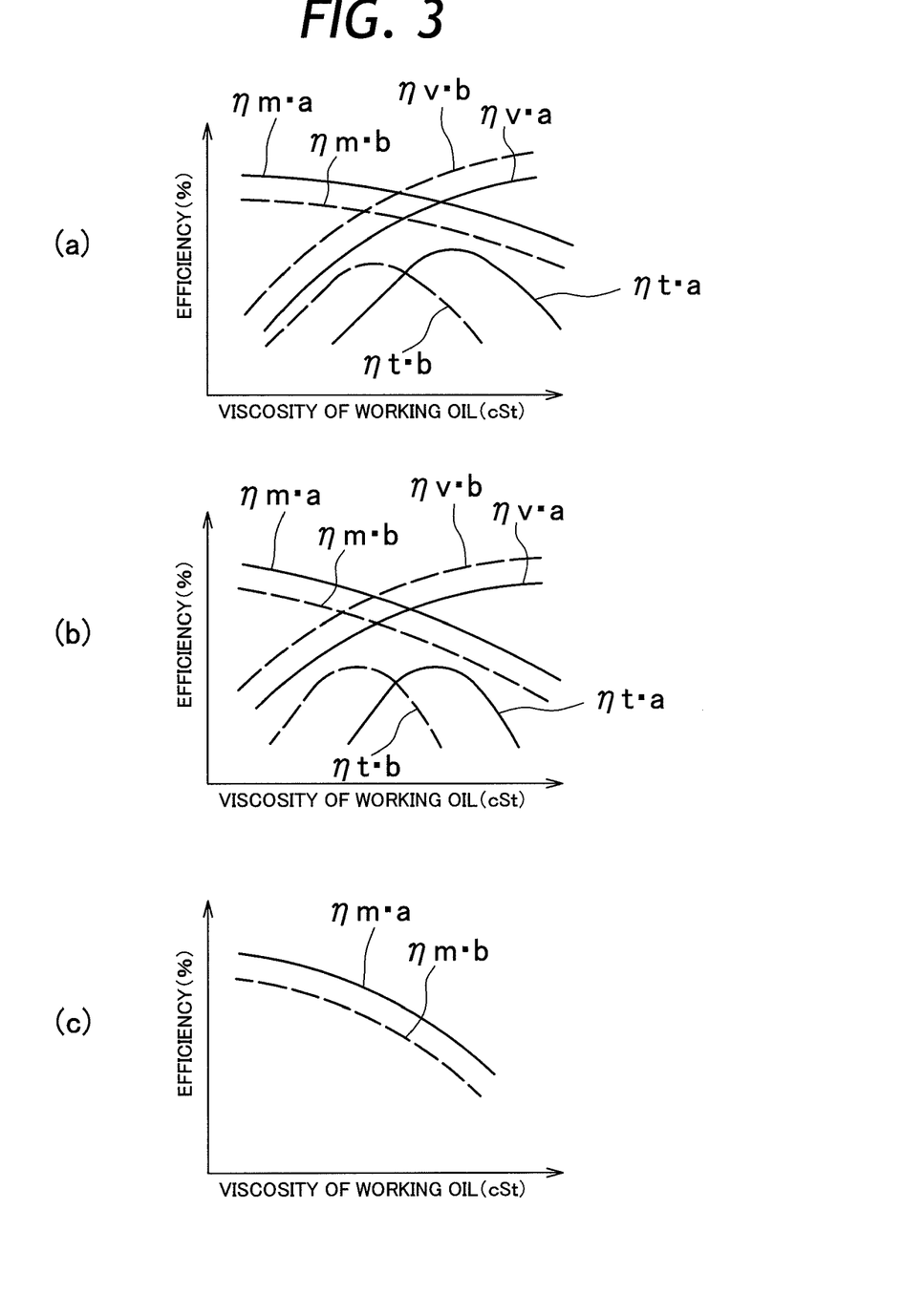
FIG. 3 A diagram showing variations in efficiency of a hydraulic pump, efficiency of a control valve and efficiency of conduit pipes in relation with variations in viscosity of working oil.

With regard to an operating condition a of a light load job and an operating condition b of a heavy load job which are indicated in the P-Q characteristics diagram of FIG. 2, plotted in FIGS. 3(a) to 3(c) are variations in efficiency of the hydraulic pump 1, in efficiency of the control valve 5 and oil conduits, especially of the discharge conduit 4 under high pressure and one of the supply and drain conduits 7, in relation with the viscosity (cSt) of working oil. In these figures, the volumetric efficiency (η v) is a ratio to a total flow rate of an actual flow rate necessary for driving the hydraulic actuator 6, the mechanical efficiency (η m) is a ratio of a preset pressure (a theoretical value) to an output pressure of the hydraulic pump 1, the efficiency of the control valve 5 and oil conduits is a ratio of a pressure on the output side to a pressure on the input side, that is to say, a degree of pressure losses.

Plotted in the diagram of FIG. 3(a) are volumetric efficiency and mechanical efficiency of the hydraulic pump 1 in relation with viscosity of working oil. Curve (η v·a) indicates a volumetric efficiency in the operation condition a and curve (η v·b) indicates a volumetric efficiency in the operating condition b. Similarly, curve (η m·a) indicates a mechanical efficiency in the operating condition a, and curve (η m·b) indicates a mechanical efficiency in the operating condition b. As seen in this diagram, the higher the viscosity of working oil, the higher becomes the volumetric efficiency. Conversely, the lower the viscosity of working oil, the higher becomes the mechanical efficiency of the hydraulic pump 1. Thus, the hydraulic pump 1 shows a total efficiency (η t) varying as indicated by curve (η t·a) in the operating condition a and as indicated by curve (η t·b) in the operating conditions b. Further, as shown in FIG. 3(b), in volumetric efficiency and mechanical efficiency relative to the viscosity of working oil, the control valve 5 has substantially the same tendency as the hydraulic pump 1, showing a volumetric efficiency as indicated by curve (η v·a) in the operating condition a and as indicated by curve (η v·b) in the operating condition b and a mechanical efficiency as indicated by curve (η m·a) in the operating condition a and as indicated by curve (η m·b) in the operating condition b, respectively. The control valve 5 shows a total efficiency (η t) as indicated by curve (η t·a) in the operating condition a and as indicated by curve (η t·b) in the operating condition b, respectively. Despite pressure losses, the oil conduits which are free from oil leaks show a mechanical efficiency as indicated by curve (η m·a) in the operating condition a and as indicated by curve (η m·b) in the operating condition b.

Figure 4:
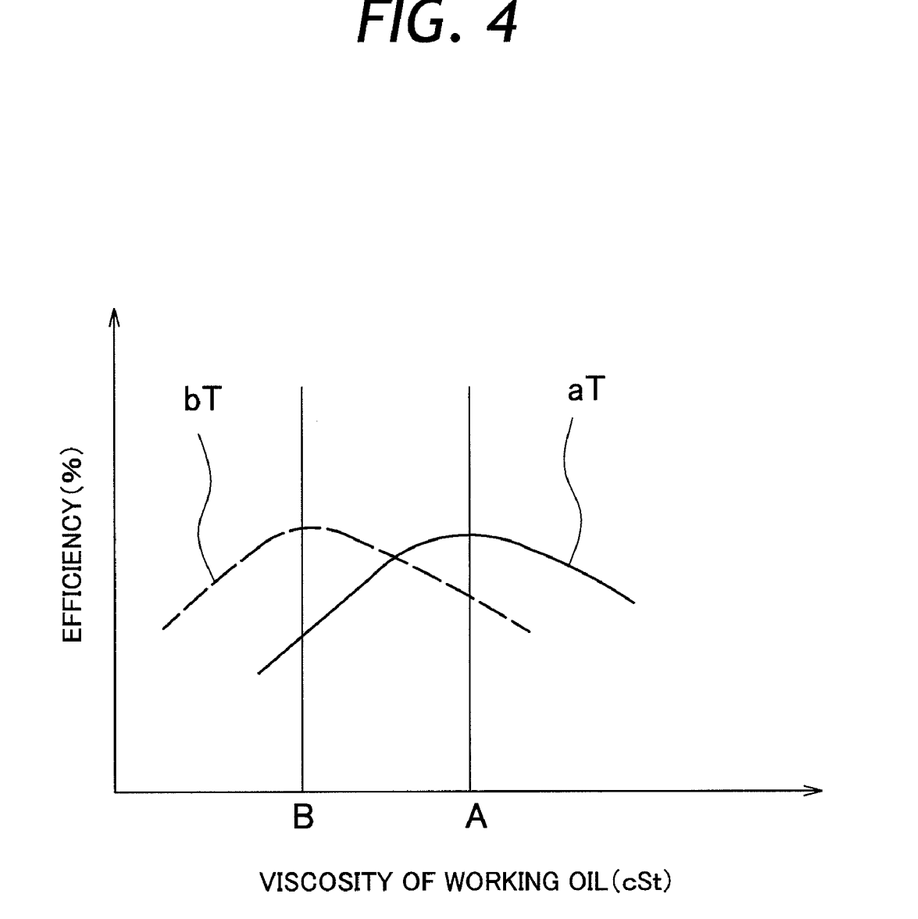
FIG. 4 A diagram showing variations in overall efficiency of a hydraulic circuit in relation with variations in viscosity of working oil.

From the foregoing points of observation, it can be known that, as shown in FIG. 4, in total the hydraulic circuit operates at an efficiency indicated by curve (aT) in the operating condition a and at an efficiency indicated by curve (bT) in the operating condition b. Accordingly, in the operating condition a, the hydraulic circuit operates at the highest operational efficiency when the viscosity of working oil is at the value A(cSt), and, in the operating condition b, when the viscosity of working oil is at the value of B(cSt) which is lower than the value A(cSt).

Since the viscosity of working oil varies substantially in proportion to its temperature, the temperature of working oil should be controlled to hold the viscosity at an optimum value, i.e., increasing the oil temperature to bring the viscosity of working oil to the optimum value A(cSt) in the operating condition a in which the hydraulic pump 1 is operated at a low pressure and at a large flow rate to carry out a light load job, and lowering the oil temperature to bring the viscosity of working oil to the optimum value B(cSt) in the operating condition b in which the hydraulic pump 1 is operated at a high pressure and at a small flow rate to carry out a heavy load job. By so doing, the efficiency of the hydraulic circuit system can be improved to a significant degree, permitting to operate the hydraulic shovel excavator in an energy-saving manner.

Figure 5:
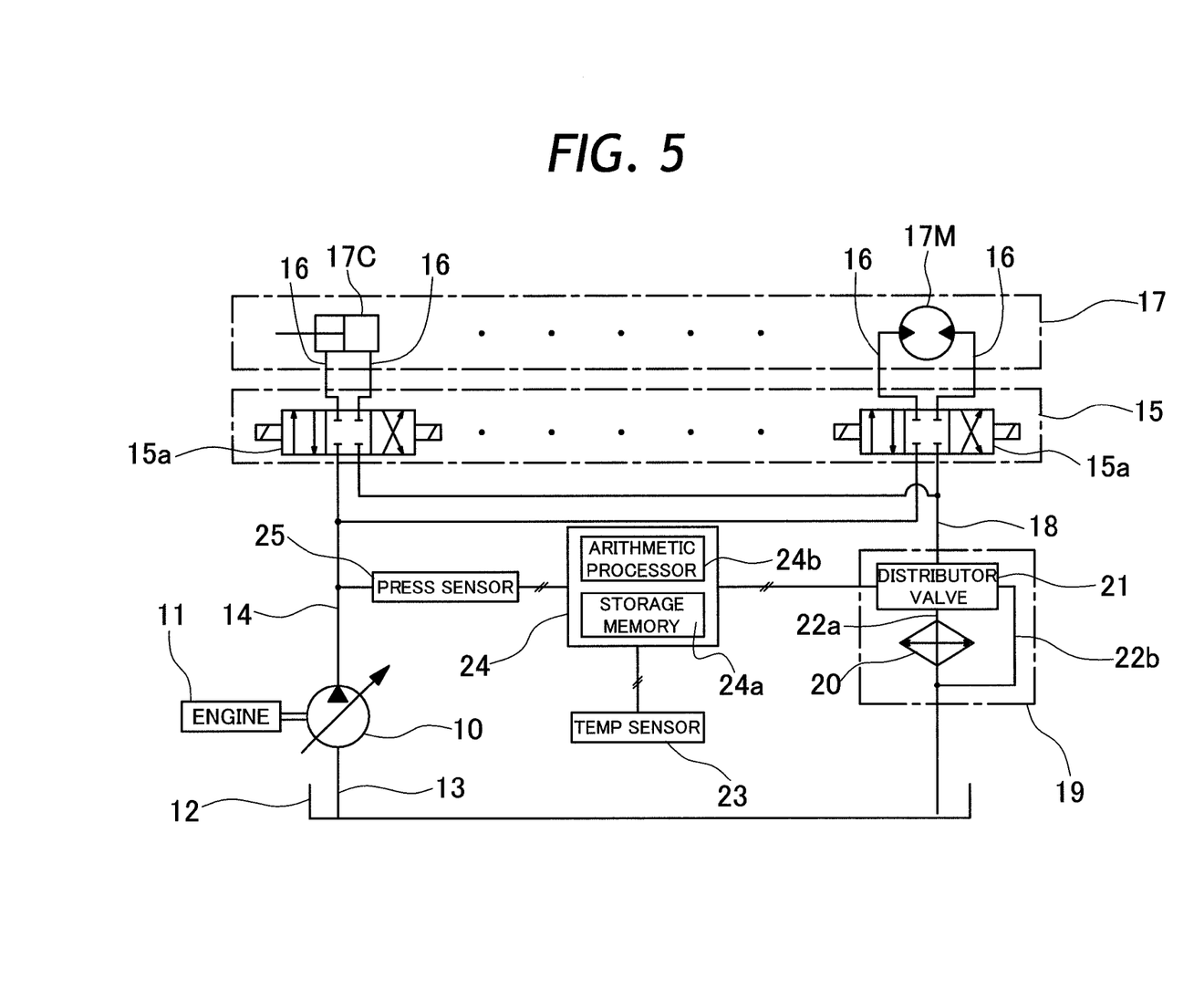
FIG. 5 A diagram showing a hydraulic circuit construction for use on a hydraulic shovel type excavator, adopted as a first embodiment of the present invention.

Shown in FIG. 5 is a particular example of a control system for varying the temperature of working oil according to operational load conditions. In FIG. 5, indicated at 10 is a variable displacement type hydraulic pump which is driven from an engine 11. Working oil is supplied to the hydraulic pump 10 through a suction conduit 13, which is connected between the hydraulic pump 10 and a working oil tank 12, and pressurized oil is delivered through a discharge conduit 14. The discharge conduit 14 is connected to a control valve unit 15 which is composed of a plural number of directional change-over valves 15a. By way of a plural number of paired supply and drain conduits 16, the control valve unit 15 is connected to various hydraulic actuators including hydraulic cylinder 17C and hydraulic motor 17M. Through a return conduit 18, return oil is sent back from the control valve unit 15 to the working oil tank 12 through a cooling means 19.

The cooling means 19 is provided with an oil cooler 20 thereby to cool down heated working oil which is returned after driving the hydraulic actuator 17. However, the return oil which is sent back through the return conduit 18 is not entirely cooled down by the oil cooler 20. A distributor valve 21 is connected in a stage anterior to the oil cooler 20 at which the return conduit 18 is bifurcated into a cooling return passage 22a for passing the working oil through the oil cooler 20 before return to the working oil tank 12 and a non-cooling return passage 22b for returning the working oil without passing through the oil cooler 20. Thus, the temperature of working oil can be varied by controlling flow rates of return oil through the cooling return passage 22a and the non-cooling return passage 22b, respectively.

Provided on the working oil tank 12 is a temperature sensor 23 which is adapted to feed a signal of a detected oil temperature to a control circuit 24. Further, a pressure sensor 25 is connected to the discharge conduit 14 (or to the hydraulic pump 10) to serve as an operational load detection means, for feeding a signal of detected operational load conditions to the control circuit 24. The control circuit 24 is composed of a storage memory section 24a and an arithmetic processor section 24b. The storage memory section 24a is adapted to store data of optimum temperatures of working oil for driving the machine in the most efficient manner at a given output pressure of the hydraulic pump 10. The arithmetic processor section 24b is adapted to read out data of an optimum oil temperature and compare same with a working oil temperature detected by the temperature sensor 23 to determine and set a ratio of flow rates of return oil between the cooling return oil passage 22a and the non-cooling return oil passage 22b of the distributor valve 22. Computed from data of the working oil temperature, acquired through the temperature sensor 23, is a mean working oil temperature within a predetermined unit time period of a detection cycle, for example, within a time period of past 1 hour. The mean working oil temperature, thus computed, is taken as a past record of operational load data, to be compared with data stored in the storage memory section 24a to compute the optimum working oil temperature for the current load factor. On the basis of the results of computation, the control circuit 24 controls the distributor valve 21 to distribute return oil between the cooling return oil passage 22a and the non-cooling return oil passage 22b at flow rates in a target ratio.

In this instance, when the hydraulic shovel excavator is at a light-load work in the operating condition a, driving the hydraulic pump 10 to deliver working oil of a low pressure at a large flow rate, as shown in FIG. 4, the temperature of working oil is set at a high level to control the viscosity of working oil to the value of A(cSt). In contrast, when hydraulic shovel excavator is at a heavy-load work in the operating condition b, driving the hydraulic pump 10 to deliver working oil of a high pressure at a low flow rate, the temperature of working oil is set at a low level to control the viscosity of working oil to the value B(cSt). That is to say, the temperature of working oil is controlled with two control modes, i.e., a control mode at a high temperature level or a control mode at a low temperature level.

Figure 6:
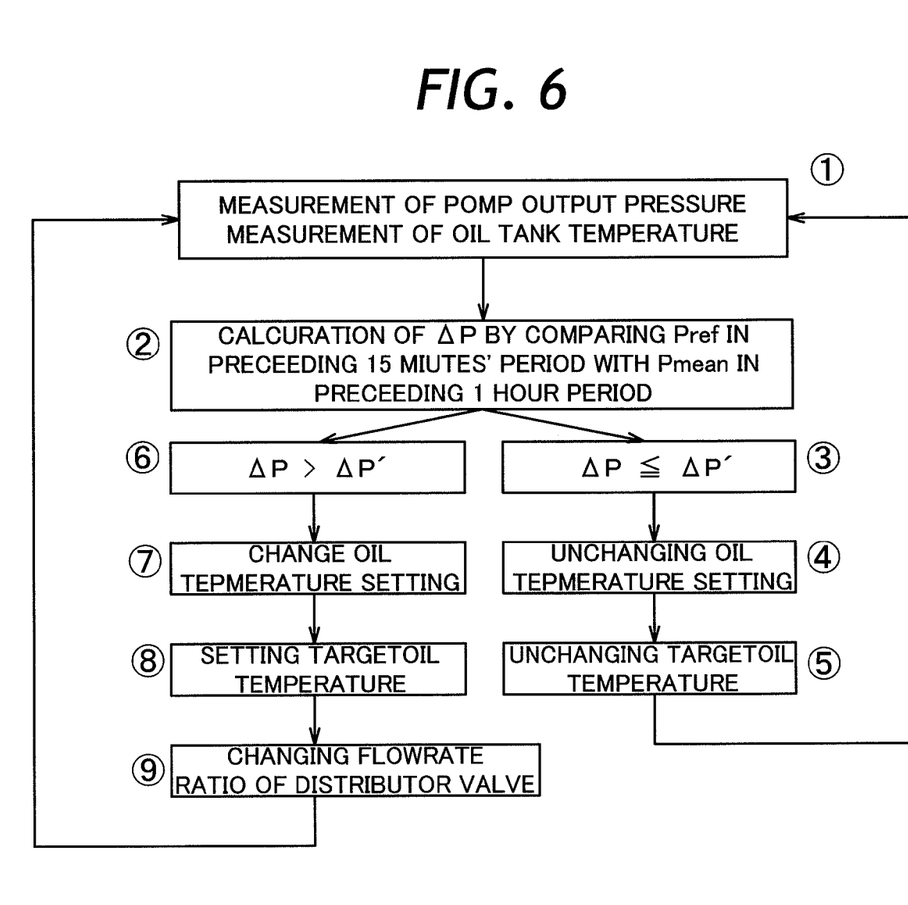
FIG. 6 A flow chart showing steps of return oil temperature control by a control circuit in the hydraulic circuit of FIG. 5.

Namely, as shown in FIG. 6, as soon as the hydraulic pump 10 is put in operation to start an action of the hydraulic shovel excavator, an operation control system starts to measure the output pressure of the hydraulic pump 10 as well as the temperature of working oil in the tank 12 (Step 1). The measurement of the output pressure is continued as long as the machine is in operation, and the control circuit 24 calculates ΔP, a difference between a mean pressure value Pref in a preceding time period of 15 minutes and a mean pressure value Pmean in a preceding time period of 1 hour (ΔP=Pref−Pmean) (Step 2). A certain neutral zone in pressure difference is provided in order to impart hysteretic characteristics, and this pressure difference ΔP between the mean pressure values Pref and Pmean is compared with a preset value ΔP' which is determined in consideration of the neutral zone. In case the pressure difference ΔP is smaller than ΔP' (Step 3), it is judged that there has been no change in the nature of operation, that is to say, it is judged as a case of unchanging a target oil temperature (Step 4) and unchanging a current return oil distribution ratio of the distributor valve 21 (Step 5). On the other hand, in case the pressure difference ΔP is larger than the preset value ΔP', the control goes to Step 6 to change a target oil temperature (Step 7), judging that there has been a change in operational load conditions, i.e., a change from a light load job to a heavy load job or vice versa. In this instance, the return oil distribution ratio of the distributor valve 21 is changed according to a newly set target temperature (Step 8).

After setting a new target oil temperature in the manner as described above, the control goes then to Step 9 to control the temperature of return oil in such a way as to let the oil temperature in the working oil tank 12 get the target value. Namely, when an oil temperature detected by the temperature sensor 23 is lower than a target oil temperature, the return oil distribution ratio of the distributor valve 21 in the cooling means 19 is changed to increase the flow rate through the non-cooling return oil passage 22B to lower a return oil cooling rate. On the other hand, when a detected oil temperature is higher than a target temperature value, the distribution ratio of the distributor valve 21 is changed in such a way as to increase the flow rate through the cooling return oil passage 22a to increase the return oil cooling rate. The above-mentioned time period of 1 hour is a unit time period in acquiring a past record of operational load data. The return oil distribution ratio is reviewed on the basis of a past record of operational load data which are acquired in every unit time period of detection cycle, that is to say, on every hour.

The above-described control is based on hysteretic settings, rather than accurately controlling right away the oil temperature in the working oil tank 12, which is under surveillance by the temperature sensor 23. Therefore, if a current working oil temperature falls in a predetermined temperature range, that temperature is maintained for the time being. This makes it possible to operate the whole system of the hydraulic circuit at a higher efficiency level when the hydraulic shovel excavator is put in operation, with remarkable energy-saving effects.

In this instance, in controlling the temperature of return oil according to operational load conditions of the hydraulic shovel excavator, operations of the machine are divided into two classes, a light load operation and a heavy load operation. However, depending upon the nature of jobs to be performed, hydraulic operations of a machine may be controlled by way of a larger number of control stages and, if necessary, in a continuous manner in one control stage. Namely, in the case a hydraulic shovel excavator, which is constructed to carry out a variety of jobs, the machine may be continuously used for a medium load job which is in load conditions between a light load operation and a heavy load operation. For example, in a case where a higher efficiency can be achieved by controlling the working oil temperature to a level or levels intermediate between an optimum temperature for a light load operation in the operating condition a and an optimum temperature for a heavy load operation in the operating condition b in FIG. 4, the return oil distribution ratio between the cooling return oil passage 22a and non-cooling return oil passage 22b of the distributor valve 21 may be controlled more finely according to signals from the control circuit. 24.

Figure 7:
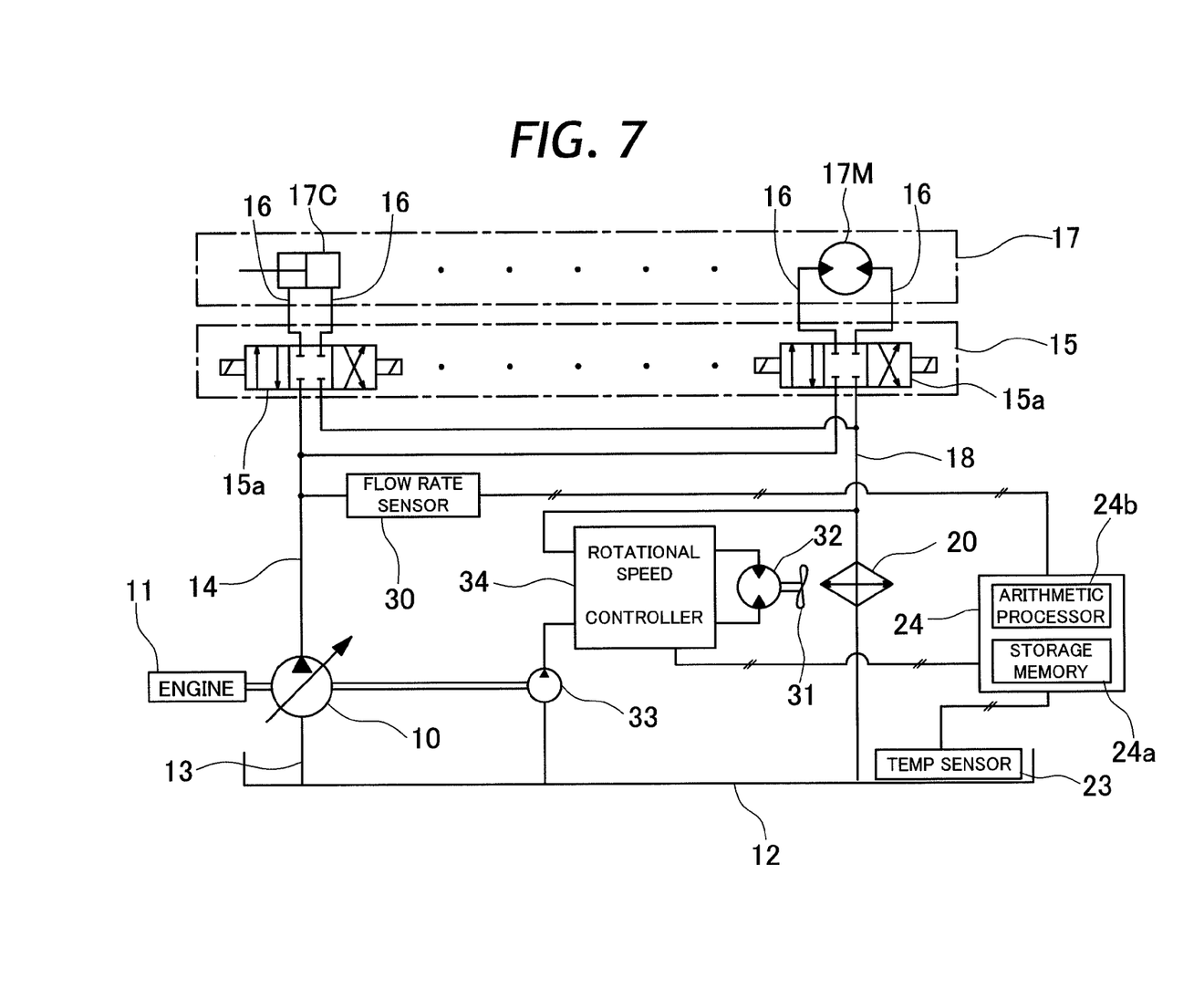
FIG. 7 A diagram showing a hydraulic circuit construction for use on a hydraulic shovel type excavator, adopted as a second embodiment of the invention.

Now, turning to FIG. 7, there is shown another embodiment of the working oil temperature control system. In FIG. 7, those component parts which are equivalent with counterparts in FIG. 5 are designated by the same reference numerals. In the case of FIG. 7, a flow sensor 30 which is adapted to detect a discharge flow rate of a hydraulic pump 10 is employed as a load condition detection means. On the basis of the P-Q characteristic diagram of FIG. 2, operational loads can be detected from the discharge flow rate of the hydraulic pump 10. Further, in this instance, return oil is cooled down by air flow from a cooling fan 31 of an oil cooler 20. The cooling fan 31 is driven by a fan driving hydraulic motor 32, which is connected to a fan driving hydraulic motor 33 which is in turn driven by an engine 11, along with a hydraulic pump 10 serving as a main pump for driving a hydraulic actuator 17. Provided between the fan driving hydraulic pump 33 and the fan driving hydraulic motor 32 is a motor speed controller 34 thereby to control the rotational speed or number of revolutions of the fan driving motor 32, constituting a working oil cooling means with a variable cooling rate for the oil cooler 20. This motor speed controller 34 is controlled by signals from a control circuit 24 which is composed of a storage memory section 24a and an arithmetic processor section 24b, and adapted to operate on the basis of an operational load condition, which is detected by a flow rate sensor 30, and an oil temperature in a working oil tank 12, which is detected by a temperature sensor 23, substantially in the same manner as in the foregoing first embodiment.

Similarly to the first embodiment, the second embodiment with the above-described arrangements can control a working oil temperature in a hydraulic circuit to an optimum value for energy-saving operations.

DESCRIPTION OF REFERENCE NUMERALS

10: Hydraulic Pump
11: Engine
12: Working oil Tank
13: Suction conduit
14: Discharge conduit
15: Control Valve Unit
16: Supply/Drain conduits
17: Hydraulic Actuator
18: Return conduit
19: Cooling means
20: Oil Cooler
21: Distributor Valve
22a: Cooling Return Passage
22b: Non-Cooling Passage
23: Temperature Sensor
24: Control Circuit
24a: Storage Memory Section
24b: Arithmetic Processor
30: Flow Sensor
31: Cooling Fan
32: Fan Driving Hydraulic Motor
33: Fan Driving Hydraulic Pump

What is claimed is:

1. In a hydraulically driven industrial machine having a variable displacement type hydraulic pump operative to take in and pressurize working oil from a working oil tank, and a hydraulic actuator supplied with discharge oil of said hydraulic pump through a control valve to perform a predetermined job:
a variable return oil cooling means capable of cooling down return oil from said hydraulic actuator at a variable cooling rate to control a working oil temperature to a given level;
an operational load detection means adapted to detect operational load conditions of said hydraulic actuator; and
a control means adapted to measure an operational load factor of said hydraulic actuator within a predetermined unit time period of detection cycle to get a mean value of said load factor as a past record of operational load data, and to determine and set a cooling rate of return oil from said hydraulic actuator on the basis of said past record of working load data.

2. A hydraulically driven industrial machine as defined in claim 1, wherein said variable return oil cooling means is provided with a distributor valve to divide a flow of said return oil between a cooling return oil passage running through an oil cooler and a non-cooling return oil passage bypassing said oil cooler, and a distribution control means for varying a return oil distribution ratio between said cooling return oil passage and said non-cooling return oil passage.

3. A hydraulically driven industrial machine as defined in claim 1, wherein said variable return oil cooling means is composed of a cooler supplied with cooling air from a cooling fan, and a rotational speed control means for controlling rotational speed of said cooling fan.

4. A hydraulically driven industrial machine as defined in claim 1, wherein said operational load detection means is adapted to pick up at least one of data of pressure or flow rate of working oil to be delivered to said hydraulic actuator.

5. A hydraulically driven industrial machine as defined in claim 1, wherein said control means is adapted to control said cooling rate of said return oil at least by way of two separate control stages, i.e., a control stage of high cooling rate optimized for a heavy load operation and a control stage of low cooling rate optimized for a light load operation.

6. A hydraulically driven industrial machine as defined in claim 1, wherein said control means is adapted to control said cooling rate continuously by one control stage covering from a high cooling rate optimized for a heavy load operation to a low cooling rate optimized for a light load operation.

7. A hydraulically driven industrial machine as defined in claim 1, wherein said control means is adapted to measure a load fact in a unit time period at least as long as one hour and to store, as a past record of operational load data, a mean value of load factors measured during in said one unit time period.

8. A hydraulically driven industrial machine as defined in claim 7, wherein said control means is adapted to compute a past record of operational load data in each unit time period upon detection of a change in operating load conditions, and to keep cooling said return oil constantly at a preset cooling rate as long as there is no change in operating load conditions.

9. A hydraulically driven industrial machine as defined in claim 7, wherein said control means is adapted to compute a past record of operational load data in every unit time period of detection cycle to set a return oil cooling rate in a succeeding unit time period.

10. A hydraulically driven industrial machine as defined in claim 7, wherein said control means is adapted to compute a moving average from past records of operational load data over a plural number of unit time periods to set a return oil cooling rate in a succeeding unit time period on the basis of a computed moving average.

11. A hydraulically driven industrial machine as defined in claim 1, wherein, in setting said return oil cooling rate, said control means is adapted to compute a setting value on the basis of a mean value of load factors measured in one unit time period and in relation with a predetermined neutral zone, comparing a measured value in a next unit time period of detection cycle with a setting value inclusive of said neutral zone.

12. A hydraulically driven industrial machine as defined in claim 1, wherein said machine is a construction machine including a hydraulic shovel type excavator.

13. A hydraulically driven industrial machine as defined in claim 11, wherein said control means is adapted to determine and set said return oil cooling rate every time when said machine is relocated to a different working site.

* * * * *